(12) United States Patent
Tejada-Gomez

(10) Patent No.: US 8,570,414 B2
(45) Date of Patent: Oct. 29, 2013

(54) MULTIPLEXED READ-OUT ARCHITECTURE FOR CMOS IMAGE SENSORS

(75) Inventor: Jose Tejada-Gomez, Tsuchiura (JP)

(73) Assignee: Texas Instruments Incorporated, Dallas, TX (US)

( * ) Notice: Subject to any disclaimer, the term of this patent is extended or adjusted under 35 U.S.C. 154(b) by 1167 days.

(21) Appl. No.: 12/366,064

(22) Filed: Feb. 5, 2009

(65) Prior Publication Data

US 2010/0194954 A1 Aug. 5, 2010

(51) Int. Cl.
 *H04N 3/14* (2006.01)
 *H04N 5/335* (2011.01)
(52) U.S. Cl.
 USPC .......................................... 348/308; 348/301
(58) Field of Classification Search
 USPC ............................................... 348/301–308
 See application file for complete search history.

(56) References Cited

U.S. PATENT DOCUMENTS 6,535,247 B1 * 3/2003 Kozlowski et al. ........... 348/241
8,530,992 B2 * 9/2013 Tian et al. ..................... 257/440

* cited by examiner

*Primary Examiner* — Scott J Sugarman
*Assistant Examiner* — Brandi Thomas
(74) *Attorney, Agent, or Firm* — Robert D. Marshall, Jr.; Wade James Brady, III; Frederick J. Telecky, Jr.

(57) ABSTRACT

This invention targets improvement in CMOS sensors using a multiplexed read-out architecture in which pixels are output at the pixel $V_N$ level instead of the line/reference amplifier level. The pixel signal voltage $V_N$ and offset voltage $V_{NS}$ are read sequentially, eliminating the differential structure. Interference rejection, usually achieved by a differential signal, is obtained by using a CDS (Correlated Double Sampler) in the same way as in the prior art.

6 Claims, 5 Drawing Sheets

MULTIPLEXED READ-OUT ARCHITECTURE FOR CMOS IMAGE SENSORS

TECHNICAL FIELD OF THE INVENTION

The technical field of this invention is CMOS image sensors.

BACKGROUND OF THE INVENTION

CMOS image sensors generally require two signals to read from each pixel in the image: (a) the pixel offset level (N); and (b) the pixel signal level (NS). The pixel offset level N does not contain image information but is the offset level of each pixel. The pixel signal level NS carries the image information relative to the offset N. Both N and NS are read for each pixel because the pixel offset N depends on parameters, such as charge feed-through during the pixel reset, which vary from pixel to pixel. These two signals are conventionally read from each pixel sequentially and stored in capacitors placed at the end of each column of pixels. The complete set of all the column capacitors is called line memory because it stores the information for a complete line of the image.

The image readout process of a conventional CMOS sensor based on passive column circuits is as follows:

(a) A line in the image is selected and corresponding small buffers inside each pixel are turned on;

(b) Each pixel buffer drives a capacitor placed at the column to store its pixel offset N;

(c) The column capacitor storing the pixel offset N is switched out and a new capacitor is switched in;

(d) The pixel buffers drive the new capacitors to store its pixel signal NS;

(e) The two lines of capacitors now store respective pixel offset N and pixel signal NS for the active image line;

(f) All pixel offset N capacitors are connected through a switch to a line called the N bus. Similarly, all pixel signal NS capacitors connect to an NS bus;

(g) The N and NS buses are reset to a reference level called $V_{ref}$;

(h) The N capacitor switch of the first column is turned on and its charge is shared with the N bus. The same happens for the NS capacitor and its bus;

(i) A differential amplifier subtracts the voltages of the N bus from that of the NS bus. The result voltage includes the difference of the $V_{ref}$ voltage of each bus, ideally zero volts, and the image information for that pixel. This is a RZ (return to zero) type of signal;

(j) A correlated double sampler circuit (CDS) samples the subtracted signal at two points: the reference level and the image level. The CDS then takes the difference of these two points and generates a NRZ (non return to zero) signal; and (k) The CDS output is then used as the input for the rest of the image signal processing chain.

FIG. 1 illustrates the one image sensor circuit employed to read signals from pixel images. A differential amplifier is formed from 101 and 102. Amplifier 103 combines the differential signals $V_N$ 111 and $V_{NS}$ 112 for processing in the correlated double sampler (CDS) 104.

FIG. 2 illustrates an alternate image sensor circuit employing a single differential amplifier 201. Differential amplifier 201 combines signals $V_N$ 211 and $V_{NS}$ 212 for processing in the correlated double sampler (CDS) 204.

The noise and the power associated with this solution are:

$$W_{total} = 2W_{buf} \quad (1)$$

$$N_{total} = \sqrt{2} N_{buf} \quad (2)$$

where: $W_{buf}$ is the power for one instance of the buffer circuit; $W_{total}$ is the total power consumption; $N_{buf}$ is the noise of one instance of the buffer circuit; and $N_{total}$ is the noise total after summing. The total power equals $2W_{buf}$ because there are two buffers in the output channel. The output channel total noise $N_{total}$ is $\sqrt{2}N_{buf}$ because the output of the two buffers is subtracted in the next processing step.

These factors make the buffer design difficult. Note that generally the gain A for each buffer will not be exactly the same:

$$A_N = A + \frac{\Delta A}{2} \quad (3)$$

$$A_{NS} = A - \frac{\Delta A}{2} \quad (4)$$

where: $\Delta A$ is the difference in gain between the gain $A_N$ and $A_{NS}$. This causes a gain error once the $V_N$ and $V_{NS}$ signals are subtracted:

$$V_{S,output} = A_N V_S - A_{NS} V_{NS} = (A - \Delta A) V_{S,output} + \Delta A V_N \quad (5)$$

where: $V_{S,input} = V_N - V_{NS}$; and ideally $V_{S,output} = A V_{S,input}$.

Matching two buffers introduces two errors. First, the differential gain decreases by $\Delta A$. Second, the gain mismatch amplifies the pixel-reset voltage ($V_N$). Note that the pixel reset is different for each pixel but does not vary over time. This thus renders as a fixed pattern on the actual image.

Although the gain decrease is not usually critical, the pixel reset voltage pattern can easily become close to a 1 $mV_{rms}$ signal across the image that is clearly visible when the noise floor is less than 10 $mV_{rms}$, which is commonly the case.

The differential amplifier approach has its own difficulties. A complicated aspect of its design is that its common-mode input changes constantly. The common-mode input is defined as the average of its input voltages:

$$V_{common} = \frac{V_{ip} - V_{in}}{2} \quad (6)$$

where: ip stands for input-positive; in stands for input-negative; $V_{in}$ is connected to the pixel reset signal $V_N$; and $V_{ip}$ is connected to the pixel signal $V_{NS}$. $V_{NS}$ is always smaller than $V_N$ because the pixel output becomes lower for more light. The output waveform $V_{NS} - V_N$ is always less than or equal to zero. The amplifier input also has two segments: the bus line reset period, when $V_{ip} = V_{in}$ thus $V_{common} = 0$; and the signal read in, where $V_{ip} \neq V_{in}$ thus $V_{common} \neq 0$.

Thus the input common mode changes for each pixel. Depending on the design this difference can be as much as 0.5 V switching at 40 MHz. This makes the design for high common mode rejection ratio (CMRR) very challenging because the CMRR needs to be over 60 dB to produce fixed pattern noise less than 0.1 $mV_{rms}$. The common practice is to introduce common-mode regeneration in the first stage of the amplifier. However, adding stages to the amplifier makes the design for high frequency and low noise more difficult.

Although the line memory readout was presented first as a series of capacitor discharges over the N and NS buses, this is not the only common approach. CMOS image sensors that present analog readouts follow one of these approaches capacitor discharge known as passive line memory or a buffer at each image column known as active line memory.

FIG. 3A and FIG. 3B illustrate the output waveforms of the two-buffer design. Each figure illustrates a repetition of two stages. There is a first stage called the reference stage. In the reference stage the output takes a known voltage $V_{ref1}$ 301 for the pixel reset level of FIG. 3A and $V_{ref2}$ 303 for the pixel signal level of FIG. 3B. The second stage is called the signal stage. In the signal stage the output takes a value that represents the actual pixel signal.

The N buffer signal 302 contains the pixel offset level. Reference signal $V_{ref}$ is normally chosen to be close to the average level of $V_N$. Thus N buffer signal 302 usually has a small amplitude less than 100 mV. The NS buffer signal 304 contains the pixel offset plus the light-dependent signal. For most CMOS image sensors brighter signals translates into lower voltages.

FIG. 3C illustrates how the light-dependent signal component is extracted from signal 302 and signal 304 by subtraction. Reference signal $V_{ref}$ is canceled out during this process. Reference signal $V_{ref}$ can be identified in 305 during a time frame dedicated to it.

FIG. 3D illustrates how Correlated Double Sampling can be used on signal 305 in order to remove the time frame devoted to the reference voltage. Signal 306 only contains light information.

FIG. 4 illustrates the capacitor discharge approach. Each pixel column includes a pair of switches 401, 402 through 408 and a pair of capacitors 411, 412 through 418. The N-output bus 410 drives N output 424 through amplifier 422. The NS-output bus 420 drives output NS output 425 through amplifier 423. The operation consists of sequential column readout where each capacitor discharges over N bus 410 or NS bus 420. Buses are reset before receiving the data in order to prevent data from adjacent columns from interfering.

The buffer version of this circuit adds a buffer after each column capacitor 411, 412 through 418. These buffers prevent charge sharing. Under charge sharing $V_N$ and $V_{NS}$ signals usually drop by 50% because after connecting the capacitors to the buses, the charge previously present in the capacitors and the parasitic capacitance of the buses will redistribute itself and effectively produce a mix of the $V_{ref}$, $V_N$ and $V_{NS}$ levels. This redistribution depends on the ratio of the column capacitor to the bus parasitic capacitance. Most designs target 50% resulting in a 50% signal loss. Using buffers at each column decreases such signal losses below 1%.

The buffer version is similar to the capacitor discharge approach in that it consists of two devices per column and a reference voltage 426. Switches 421 connect reference voltage 426 to N bus 410 and NS bus 420 to reset during the reset period. These two approaches introduce the same difficult mismatching challenge for the N and NS buffers. The problem is to match two elements which decreases the differential gain and causes fixed pattern error in the image.

SUMMARY OF THE INVENTION

This invention is an improvement in CMOS image sensors using a multiplexed read-out architecture which eliminates the time frame dedicated explicitly to the reference level of the bus lines ($V_{ref}$). The reference level is extracted directly from the $V_N$ and $V_{NS}$ signals. This has significant implications because the circuit design is reduced to single level. The pixel $V_N$ and $V_{NS}$ voltages are read sequentially eliminating the differential structure. Interference rejection, achieved by the differential signal in the prior art, is obtained by using a correlated double sampler (CDS) in the same way as in the current system.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
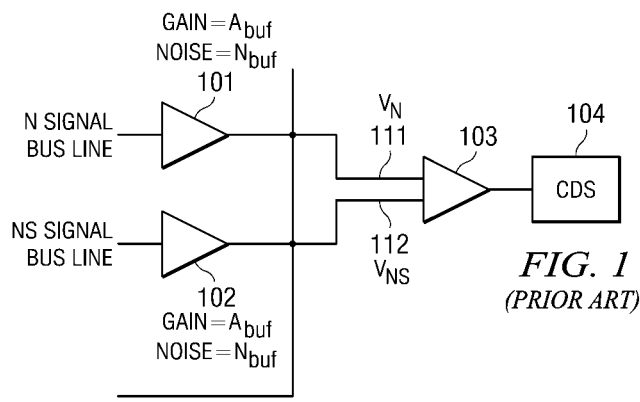
FIG. 1 illustrates a CMOS image sensor output circuit using two output buffers (Prior Art)
Figure 2:
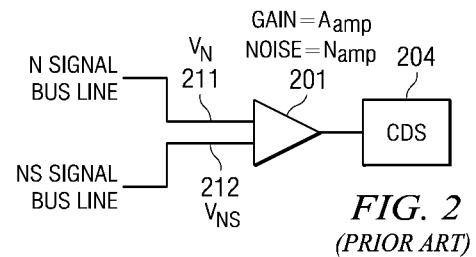
FIG. 2 illustrates a CMOS image sensor output circuit using a differential amplifier (Prior Art)
Figure 3A:
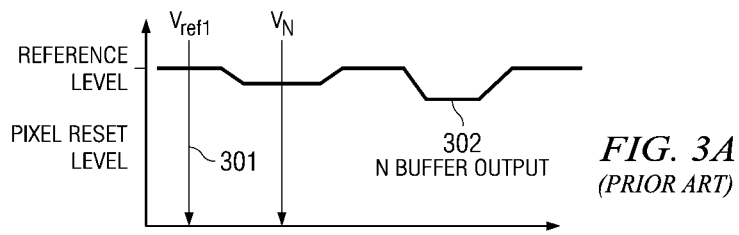
FIG. 3A illustrates for the two-buffer design the reference level contrasted with pixel reset level for N buffer output operations; (Prior Art)
Figure 3B:
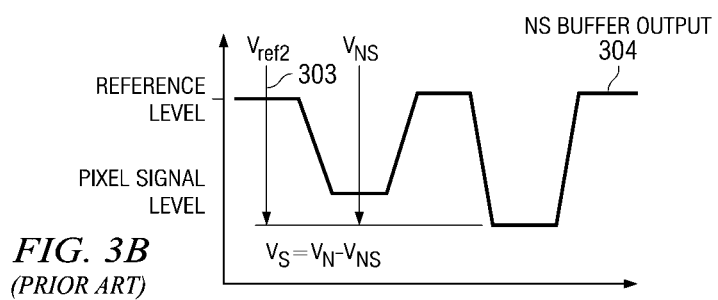
FIG. 3B illustrates for the two-buffer design the reference level contrasted with pixel signal level for NS buffer output operations; (Prior Art)
Figure 3C:
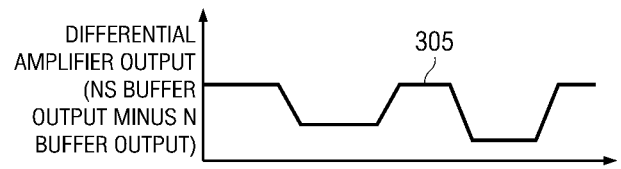
FIG. 3C illustrates for the two-buffer design the differential amplifier output derived from the difference in the NS buffer output and the N buffer output (Prior Art)
Figure 3D:
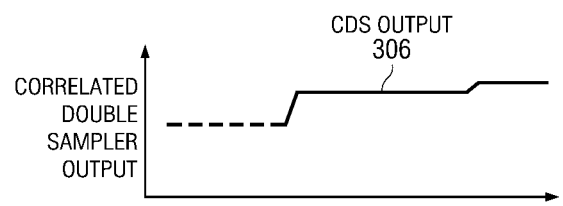
FIG. 3D illustrates for the two-buffer design the correlated double sampler output (Prior Art)
Figure 4:
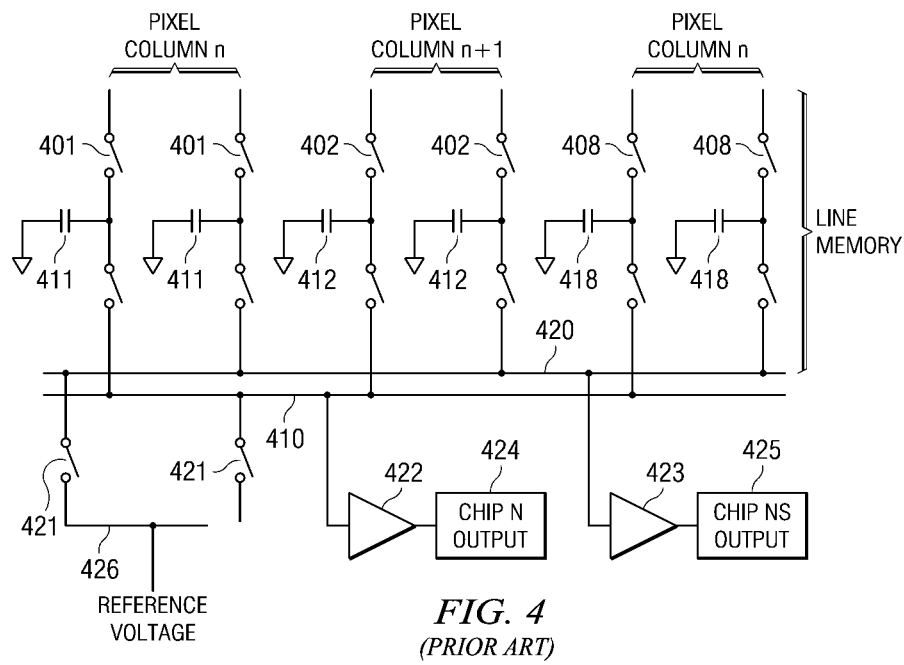
FIG. 4 illustrates the capacitor approach for injecting pixel output into the data bus line (Prior Art)
Figure 5:
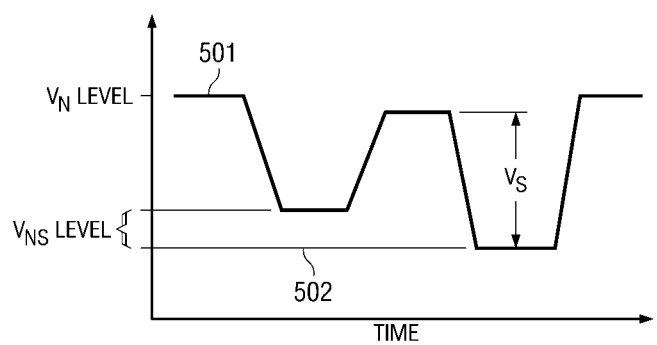
FIG. 5 illustrates outputting the pixel $V_N$ level instead of the line/amplifier reference level.

FIG. 5 illustrates this invention which obtains pixel information by directly applying the CDS to the $V_N$ level 501 and $V_{NS}$ level 502 instead using a subtract circuit such as a differential amplifier as in like prior art. This significantly alters the circuit design at its lowest level. This invention has only one element, either buffer or amplifier, eliminating the need to match elements and preventing an increase in noise and power. Eliminating a differential input removes the difficult CMRR specifications making the amplifier easier to implement.

Waveform 501 is at the output and the chip buffer input for active line memory imagers. Using column buffers implies that a single bus line is used and thus the N and NS levels are output directly. From the point of view of the external CDS, the processing of signal 501 is done exactly the same as it was done before the CDS was introduced. The CDS samples $V_N$ 501 and $V_{NS}$ 502 and produces the desired voltage $V_{NS}$. Thus the invention simplifies internal circuits without affecting current board designs.

Figure 6:
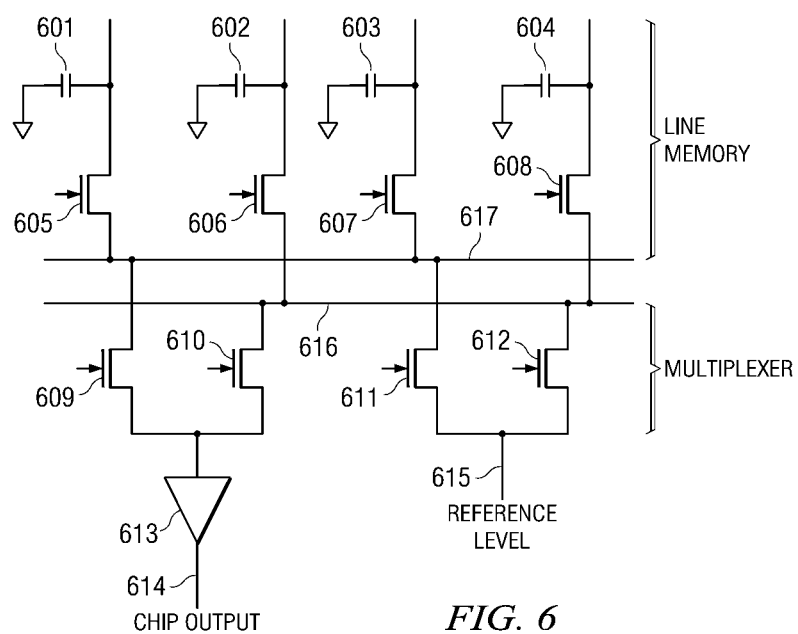
FIG. 6 illustrates the multiplexer implementation for the capacitor type read-out circuit.

FIG. 6 illustrates a multiplexer implementation for a capacitor read-out circuit. FIG. 6 illustrates only two columns for simplicity. A typical design has from 400 to 4000 columns. Capacitors 601 through 604 form the line memory. Capacitor 601 stores the $V_N$ signal and capacitor 602 stores the $V_{NS}$ signals of the first column. Similarly, capacitor 603 stores the $V_N$ signal and capacitor 604 stores the $V_{NS}$ signal of the second column.

Column switches 605 and 607 connect respective N capacitors 601 and 603 of each column to N bus 617. Switches 608 606 and 608 respective connect NS capacitors 602 and 604 to NS bus 616. Switches 609 and 610 connect the respective N bus 617 and the NS bus 616 to the input of amplifier 613. Switches 611 and 612 perform zeroing on the respective N bus 617 and NS bus 616 forcing them to the reference level 615.

Figure 7:
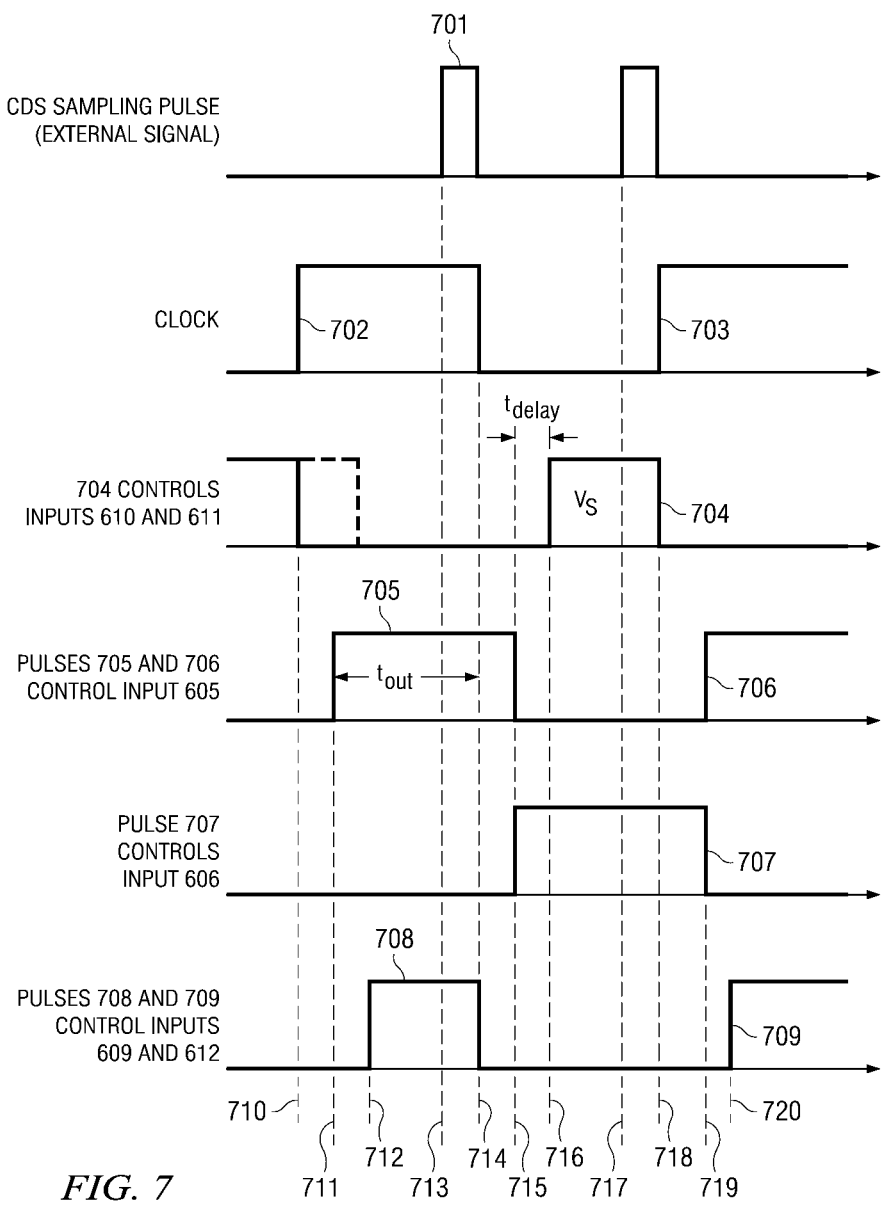
FIG. 7 illustrates a timing diagram for signals driving the multiplexers of the capacitor type read-out circuit of FIG. 6.

FIG. 7 illustrates the timing diagram for control signals driving the multiplexers of the capacitor type read-out circuit of FIG. 6. FIG. 7 shows how each bus goes from carrying a signal to being reset and vice versa.

The following happens beginning at time 710. Pulse 704 is high from the previous data output. Pulse 704 turns switches 611 and 610 ON setting N bus 617 to reference level 615. Pulses 705 and 707 are low turning switches 605 and 606 OFF. Switch 610 connects NS bus 616 to output 614 through amplifier 613.

The following happens between times 710 and 714. At time 710, a system clock (not shown) signals the start of a new pixel. The new pixel data is stored in capacitors 601 and 602. As the system clock rises, pulse 704 goes low. This turns switch 610 OFF leaving the input of amplifier 613 floating.

At time 711 in response to the system clock, pulse 705 goes high. This turns switch 605 ON. Switch 605 passes the $V_N$ signal on capacitor 601 to N bus 617.

At time 712, pulse 709 goes high. This turns switch 609 ON connecting N bus 617 to the input of amplifier 613. Until time 714, when pulse 708 goes low, chip output 614 tracks N bus 617, which holds the N value of active column one. At the same time, pulse 708 going low also turns switch 612 OFF. This disconnects reference level 615 from NS bus 616.

The following happens between times 715 and 719. At time 715, pulse 705 goes low and turns OFF switch 605. Pulse 707 does high and turns ON switch 606. This passes $V_{NS}$ stored on capacitor 602 to NS bus 616. At time 716, pulse 704 goes high and turns ON switch 610. This connects amplifier 613 to NS bus 616. Pulse 704 also turns ON switch 611 connecting reference level 615 to N bus 617. This state continues until time 718, with chip output 614 connected to NS bus 616. At time 718, pulse 704 goes low turning switch 610 OFF. This leaves the input of amplifier 613 floating.

Pixel data acquisition through the CDS occurs as follows. At time 713, pulse 701 triggers the CDS circuit to takes a sample of output 614. At time 717, pulse 701 again triggers the CDS circuit to samples chip output 614. The CDS subtracts the two samples and obtains the pixel data.

Reference level 615 is included in the two samples because of the charge sharing. Assuming a unity gain amplifier, chip output 614 at time 717 is:

$$V_{out}=A_{lm}V_N+(1-A_{lm})V_{ref} \quad (7)$$

where: $A_{lm}$ is the line memory gain, which is always smaller than unity and defined as:

$$A_{lm} = \frac{C_{mem}}{C_{mem} + C_{par}} < 1 \quad (8)$$

This invention reduces read-out power consumption by a factor of 2. This occurs because the number of required buffers is divided by 2, with power consumption decreased by the same factor. This is particularly important for the active line memory circuits because column buffers will be the main power consumer. This invention reduces in-column matching error to zero when using column buffers. Having only one buffer per column eliminates matching errors. This invention reduces column-to-column matching error by a factor of 2 when using column buffers by reducing the number of devices to match from column to column.

Let $C_{mem}$ be the column capacitor (601, 602, etc.) and $C_{par}$ be the parasitic capacitance of the bus. Assume a typical line memory gain $A_{lm}$=0.5. Chip output 614 at time 717 contains 50% of the original $V_N$ signal and 50% of the $V_{ref}$ reference. The same applies to the second sample, taken at time 717:

$$V_{out}=A_{lm}V_{NS}+(1-A_{lm})V_{ref} \quad (9)$$

When the CDS subtracts these two samples, the $V_{ref}$ portion cancels out leaving only:

$$V_{CDS}=A_{lm}(V_N-V_{NS})=A_{lm}V_S \quad (10)$$

Thus, the present invention obtains the image signal $V_S$ without using a differential amplifier. A delay between the N and NS outputs causes the CDS to do all the calculation.

Figure 8:
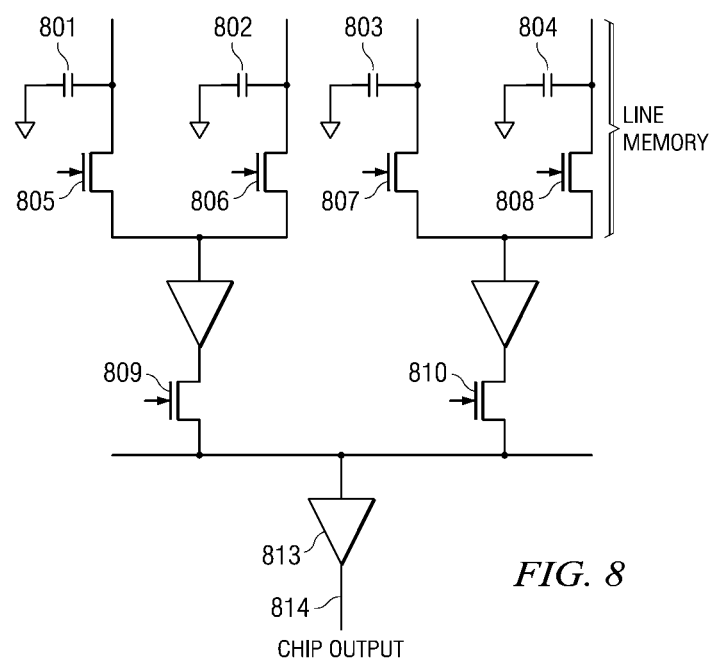
FIG. 8 illustrates how this invention is implemented in an active line memory configuration.

FIG. 8 illustrates this invention implemented in an active line memory configuration. Active line memories have amplification elements to prevent $A_{lm}$ from being less than unity. They use a column active element, such as a buffer, removing the need for the bus reference level 615 in FIG. 6 and for auto-zeroing schemes in the column buffer/amplifier.

The main difference between the passive memory line case of FIG. 6 and the active memory line case of FIG. 8 is the place where the multiplexer is placed. In FIG. 6 this multiplexer formed by switches 609 and 610 is place between separate N bus 617 and NS bus 616 and the input of amplifier 613. Using active memory lines as illustrated in FIG. 8, the multiplexer is implemented at the column. Thus switches 805 and 806 form the multiplexer for the first column and switches 807 and 808 form the multiplexer for the second column.

Apart from the location of the multiplexer, operation is basically the same as described in conjunction with FIGS. 6 and 7. Each column sequentially outputs $V_N$ and $V_{NS}$ through its buffer. Chip output 814 has the same shape as chip output 614 in FIG. 6. The external CDS works in the same manner to remove common mode signals like the DC offset of the column buffer.

This invention takes advantage of the existing external CDS in order to simplify the design and improve performance. Other solutions to this problem typically design highly specified blocks. This invention relaxes the specifications for most blocks and completely removes some error elements. This invention has the following advantages.

This invention reduces the noise created by the chip output buffer by a factor of $\sqrt{2}$. The prior art uses one buffer for each memory line bus thus using two in total. The outputs of these two buffers is eventually become subtracted at the CDS and their noise combined. Thus, after the CDS the noise contribution of the two buffers is equal to $\sqrt{2}N_{buf}$, where $N_{buf}$ is the noise of a single buffer. However, this invention uses only one buffer. Thus the buffer contribution to the noise after the CDS is only $N_{buf}$, which is $\sqrt{2}$ times smaller than the prior art.

This invention decreases the noise created by the column buffer by a factor of $\sqrt{2}$. A conventional column buffer implementation requires two buffers per column, one for N and one for NS. This invention requires only one buffer per column. Thus the noise contribution of the buffer is a factor of $\sqrt{2}$ less using this invention.

This invention reduces fixed pattern noise due to mismatches to zero. Mismatches in the N buffer and NS buffer in the prior art results in fixed pattern noise in the image due. This occurs because mismatching in the response of the two buffers results in some fraction of the $V_N$ and reference signal $V_{ref}$ getting through to the output of the CDS. This invention performs the same processing using only one buffer eliminating any buffer matching requirement.

This invention provides on-chip gain using a single-ended amplifier if needed. Thus there is no need for high CMRR. This comes from the substitution of the physical differential signal of N and NS traveling through two wires for a time differential signal of N and NS travel through the same wire at different times. Thus all processing can be done single-ended and still gain the advantages of differential signals from the final CDS step.

This invention reduces read-out power consumption by a factor of 2 by decreasing the number of required buffers by a factor of 2. This is particularly important for the active line memory case because column buffers will be the main power consumer.

This invention reduces in-column matching error to zero when using column buffers. Having only one buffer per column eliminates matching errors.

This invention reduces column-to-column matching error by a factor of 2 by decreasing the number of required buffers by a factor of 2.

What is claimed is:

1. A method of processing data from an electronic imager comprising the steps of:
   sampling a pixel offset level for a pixel of a predetermined row and storing a charge in a pixel offset column capacitor of a corresponding column of pixels;
   connecting said pixel offset column capacitor to an imager output during a first time interval including
      connecting said pixel offset column capacitor to a pixel offset bus shared among plural columns, and
      simultaneously connecting said pixel offset bus to an input of an output buffer;
   sampling a pixel signal level for said pixel of said predetermined row and storing a charge in a pixel signal column capacitor of said corresponding column of pixels;
   connecting said pixel signal column capacitor to said imager output during a second time interval distinct from said first time interval including
      connecting said pixel signal column capacitor to a pixel signal bus shared among plural columns, and
      simultaneously connecting said pixel signal bus to said input of said output buffer; and
   subtracting said pixel offset level from said pixel signal level for said pixel employing a correlated double sampler circuit.

2. The method of claim 1, further comprising the step of:
   connecting said pixel offset bus to a predetermined voltage during a time other than said first time interval.

3. The method of claim 1, further comprising the step of:
   connecting said pixel signal bus to a predetermined voltage during a time other than said second time interval.

4. A method of processing data from an electronic imager comprising the steps of:
   sampling a pixel offset level for a pixel of a predetermined row and storing a charge in a pixel offset column capacitor of a corresponding column of pixels;
   connecting said pixel offset column capacitor to an imager output during said first time interval including
      connecting said pixel offset column capacitor to an input of a column buffer for said column, and
      simultaneously connecting an output of said column buffer to an input of an output buffer;
   sampling a pixel signal level for said pixel of said predetermined row and storing a charge in a pixel signal column capacitor of said corresponding column of pixels;
   connecting said pixel signal column capacitor to said imager output during a second time interval distinct from said first time interval including
      connecting said pixel signal column capacitor to said input of said column buffer for said column, and
      simultaneously connecting an output of said column buffer to said input of said output buffer; and
   subtracting said pixel offset level from said pixel signal level for said pixel employing a correlated double sampler circuit.

5. The method of claim 4, further comprising the step of:
   connecting said pixel offset bus to a predetermined voltage during a time other than said first time interval.

6. The method of claim 4, further comprising the step of:
   connecting said pixel signal bus to a predetermined voltage during a time other than said second time interval.

* * * * *